United States Patent [19]

Nisley

[11] 4,120,388
[45] Oct. 17, 1978

[54] DRY FLUID DRIVE AND ROTOR THEREFOR

[75] Inventor: Donald L. Nisley, Mishawaka, Ind.

[73] Assignee: Reliance Electric Company, Mishawaka, Ind.

[21] Appl. No.: 738,705

[22] Filed: Nov. 4, 1976

[51] Int. Cl.² ............................................. F16D 23/10
[52] U.S. Cl. .............................. 192/105 A; 192/58 A
[58] Field of Search .............. 192/105 A, 58 A, 58 B, 192/85 F, 58 R; 64/26

[56] References Cited

U.S. PATENT DOCUMENTS

| | | | |
|---|---|---|---|
| 1,848,615 | 3/1932 | Fottinger | 192/58 A |
| 1,848,616 | 3/1932 | Fottinger | 192/58 A |
| 2,702,617 | 2/1955 | Danies | 192/58 A |
| 2,771,170 | 11/1956 | Badin | 192/58 A |
| 2,813,606 | 11/1957 | Badin | 192/58 A |
| 2,837,191 | 6/1958 | Terry | 192/58 A |
| 2,844,782 | 7/1958 | Wentworth | 192/301 N |
| 2,844,782 | 7/1958 | Wentworth | 192/30 W X |
| 2,895,579 | 7/1959 | Terry | 192/58 A |
| 2,895,580 | 7/1959 | Badin | 192/58 A |
| 2,901,074 | 8/1959 | Badin | 192/58 B |
| 2,905,293 | 9/1959 | Winther | 192/105 A X |
| 2,910,160 | 10/1959 | Meder | 192/105 A |
| 3,460,658 | 8/1969 | Badin | 192/105 A |
| 3,865,216 | 2/1975 | Gryglas | 192/58 A |
| 4,000,793 | 1/1977 | Chung | 192/105 A |

FOREIGN PATENT DOCUMENTS 572,431  10/1958  Belgium ................ 192/105 A

*Primary Examiner*—William F. O'Dea
*Assistant Examiner*—Larry Jones
*Attorney, Agent, or Firm*—Marmaduke A. Hobbs

[57] ABSTRACT

A dry fluid drive having a rotatable housing with a cavity therein and a rotor disposed in the cavity, the rotor consisting of a radially extending center portion and a laterally extending flange disposed at the periphery of said rotor center portion. The flange which preferably is disposed at right angles to the center portion and extends laterally on both sides thereof, contains a plurality of openings to assist in the distribution of the dry fluid in the housing which is so constructed and designed that a restricted area is provided at the cavity periphery in which the flange is disposed. Ribs or other types of protrusions are preferably on the periphery of the flange to improve the transfer of torque between the housing and rotor.

11 Claims, 4 Drawing Figures

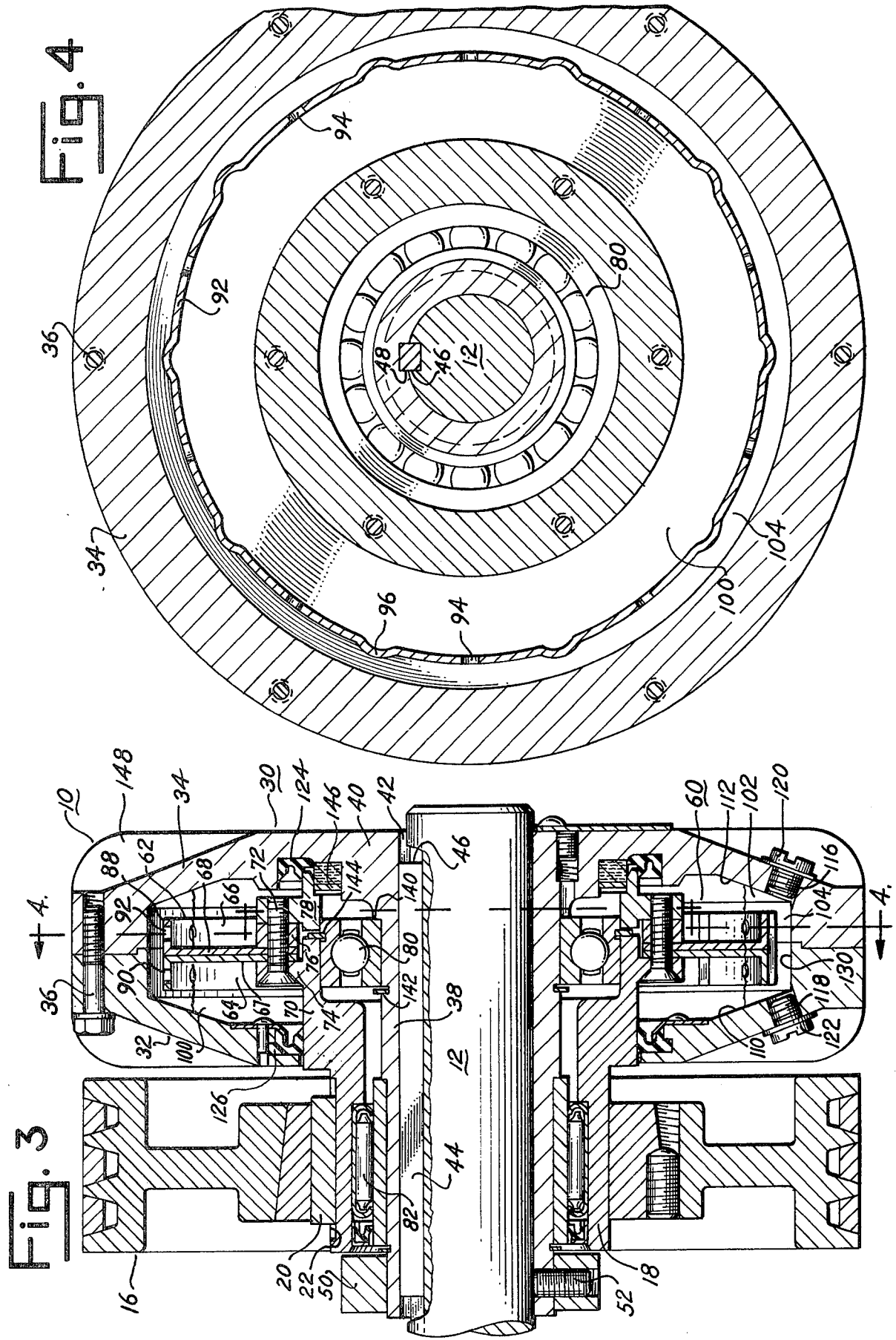

DRY FLUID DRIVE AND ROTOR THEREFOR

For a number of years dry fluid drives have been used in industry to couple motors to the power input shafts of equipment, such as conveyors and machinery which place an initial heavy starting load on the motor or are subjected to a large magnitude in variation of heavy loads from time to time in the normal operation of the equipment. One type of dry fluid drive, or coupling or clutch, as it is sometimes referred to, is disclosed in U.S. Pat. No. 2,813,606, for connecting two rotatable shafts in end to end relation. This prior drive consists of a casing mounted on and secured to one of the shafts for rotation therewith and having a rotor cavity therein, and a rotor disposed in the cavity and secured to a sleeve or bushing, which in turn is mounted on and secured to the other shaft for rotation therewith and for rotation relative to the casing. The cavity contains the dry fluid, normally consisting of small heat treated steel shot, which is thrown by centrifugal force transmitted from the drive shaft to the casing, and, as the drive shaft and casing accelerate in rotation, the shot initially permits slippage or relative rotation between the casing and rotor, and as the rotation approaches full or normal operating speed, it forms virtually a solid mass packed between the internal walls of the casing and rotor and effectively locking these components together. The slippage which occurs during the initial stages of starting, produces a smooth acceleration without placing an abrupt load on the motor or equipment, and the formation of the solid mass as the casing approaches full acceleration, results in freedom of slippage, giving an operating efficiency in transmitting power from the drive shaft to the driven shaft approaching one hundred percent.

The dry fluid drive or coupling has many advantages over mechanical or other fluid couplings, in that relatively smaller motors can be used in all or most installations, maintenance on the motors and equipment is significantly reduced by the smooth starting performance, the initial rush of electrical current is reduced to minimum duration, approaching the requirements of noload starting, and the shock or strain from overloading during normal operation on the motor and equipment is eliminated or minimized. However, the foregoing dry fluid drives have certain inherent disadvantages or problems under certain operation conditions, these including a tendency of the drives to over-heat if slippage occurs over an appreciable period of time during starting and acceleration or while the motor and equipment coupled by the drive are operated at frequent intervals or for an extended period of time in an overloaded condition. Other disadvantages include the necessity of relatively large drives for certain installations, and the inability of the shot to distribute itself uniformly efficiently and effectively during acceleration, causing vibration in the drives which may in some instances be transmitted to the motors and equipment. Attempts have been made in the past to obtain more torque with compact drive structures, one of these consisting in utilizing two rotors disposed in separate cavities in the housing, thus in effect forming a dual or multiple housing structure. In this type, the surface of the inner or intermediate walls may be of the same configuraton as the surface of the two outer walls defining the cavities, or they may have a somewhat different configuration such as disclosed in U.S. Pat. No. 2,901,074. While improved torque characteristics resulted, the unit is relatively inefficient when its increased size and weight over the conventional single cavity drive are taken into consideration. It is therefore one of the principal objects of the present invention to provide a dry fluid drive of the aforesaid type which will develop greater torque with a given size than the present standard drives of this type, and which has good heat dissipating characteristics and hence is capable of operating under loads producing slippage between the casing or housing and the rotor during starting and overload conditions without becoming overheated.

Another object of the invention is to provide a dry fluid drive having a rotatable housing and a rotor operatively interconnected by a mass of steel shot, in which the shot is readily distributed uniformly in the housing as the drive initially accelerates, and which effectively utilizes the area of the rotor and housing cavity near the periphery for minimizing or eliminating slippage between these parts when the drive is under load.

Still another object of the invention is to provide a dry fluid drive of the aforesaid type which is so constructed and designed that it will give long trouble-free service with little wear on the moving parts, and which, because of is compact structure and high torque under load, has a wide application in motor and machine installations.

Further objects and advantages of the present invention will become apparent from the following description and accompanying drawings, wherein:

FIG. 3 is an axial cross sectional view of the drive shown in the preceding figures, the section being taken on line 3 — 3 of FIG. 2; and FIG. 4 is a transverse cross sectional view of the dry fluid drive shown in the preceding figures, the section being taken on line 4 — 4 of FIG. 3.

Figure 1:
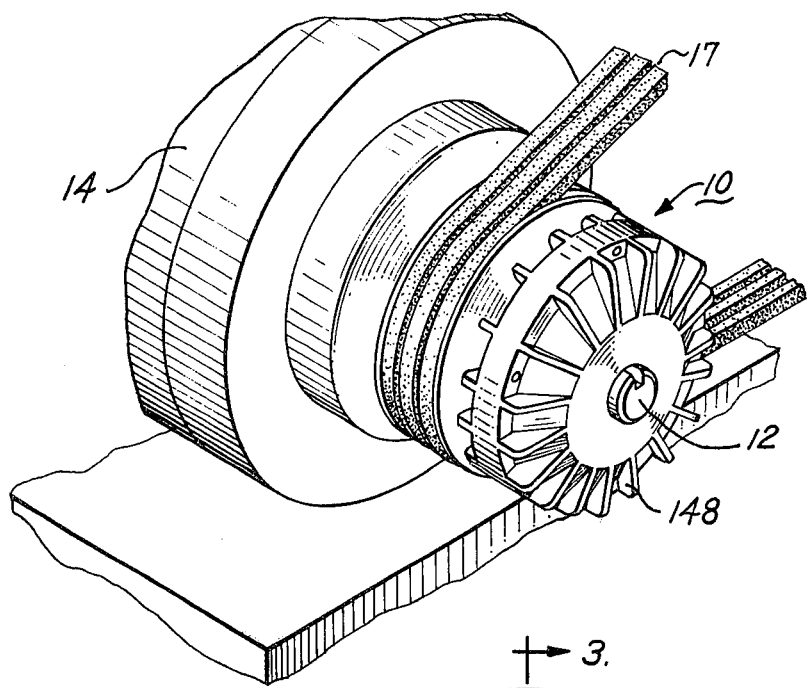
FIG. 1 is a perspective view of an equipment installation in which my dry fluid drive is shown mounted on the equipment and being driven by a motor through a plurality of V-belts.
Figure 2:
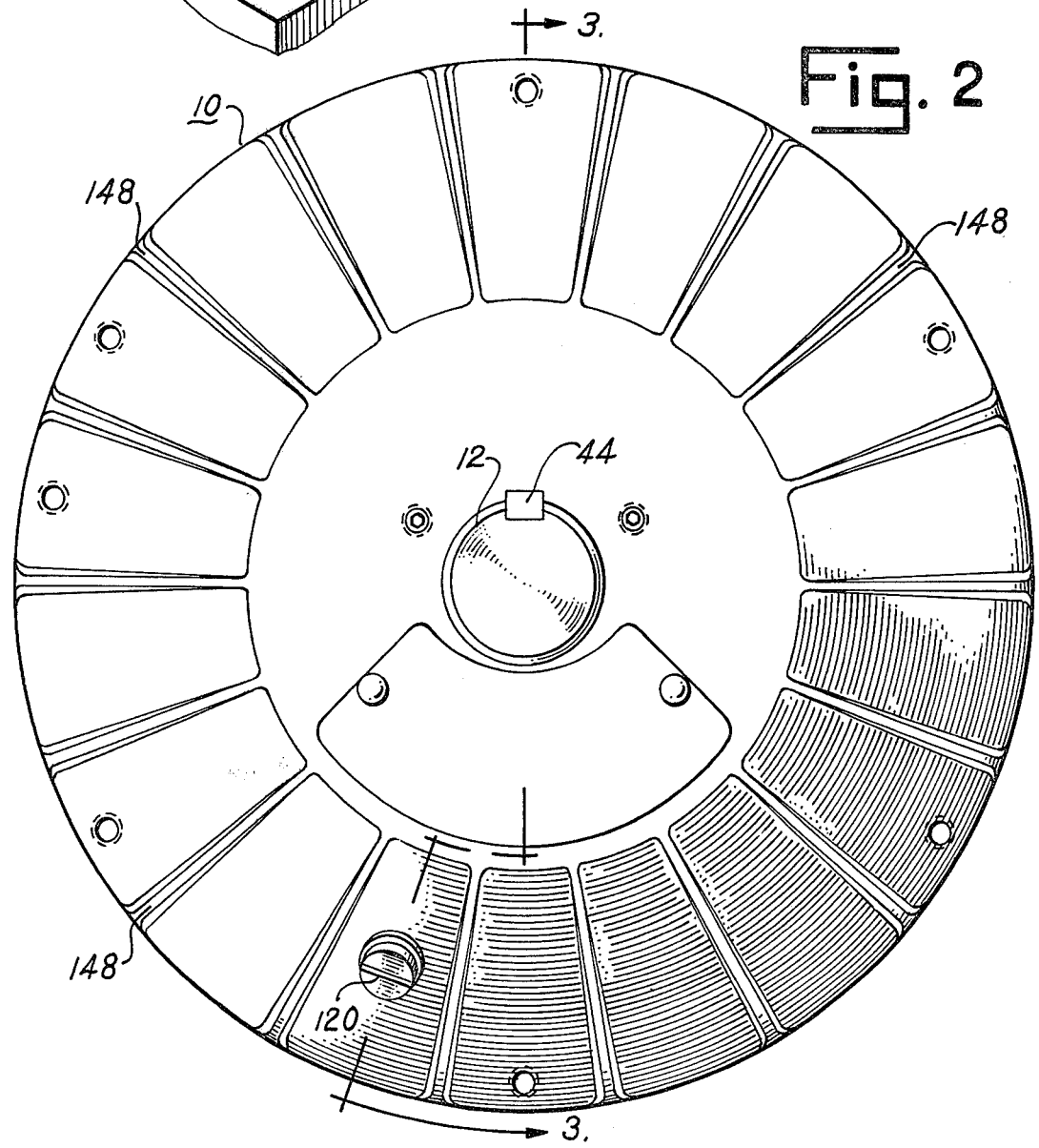
FIG. 2 is a side elevational view of the dry fluid drive shown in FIG. 1.

Referring more specifically to the drawings and to FIG. 1 in particular, numeral 10 designates generally my dry fluid drive showing the drive mounted on a shaft 12 of a motor 14 for driving a machine or other equipment, such as a conveyor, blower drive, or tumbling drum. The drive embodying the present invention may be used in a number of different types of installations, including, for example, those having a sheave and belt or belts and those having two shafts in end-to-end relation, in which the present drive operates as a coupling, either alone or in conjunction with other types of couplings such as a flexible coupling to compensate for misalignment of the two shafts. In the embodiment illustrated in the drawings, a sheave 16 for a V-belt 17 is mounted on and connected to drive 10 on a cylindrical projection 18 with key and key ways 20 and 22, respectively, being used as a means for securing the sheave to the drive.

The drive 10 consists of a housing 30 having two sections 32 and 34 secured together to form a rigid unit by a plurality of screws 36 extending through holes disposed around the peripheral margin of the two sections. The two sections have inwardly extending side walls, and section 34 has a laterally extending sleeve 38 joined integrally with its side wall at base portion 40 so that the housing and sleeve rotate together. Sleeve 38 has a bore 42 for receiving shaft 12, which is secured to the sleeve by a key 44 in keyways 46 and 48 in the shaft and sleeve, respectively. A collar 50, having one or more set screws 52 extending radially therein, is preferably mounted don sleeve 38 and, when the drive is mounted on shaft 12, the set screws extend through the sleeve and engage either the shaft on key 44, thus assisting in securing the drive rigidly to the shaft.

As shown in FIG. 3, a rotor assembly, indicated generally by numeral 60, includes a rotor 62 constructed of two lateral sections 64 and 66 of identical construction, the two sections having disc shaped radially extending inner members 67 and 68 in face-to-face contact with one another. The two sections are secured to a hub 70 by a plurality of screws 72 extending through hub section 74 and spacer 76 into hub section 78, the screws clamping the two hub sections together with members 67 and 68 disposed rigidly therebetween. The hub 70 is supported on a ball bearing 80 and needle bearing 82 for rotation relative to the housing, and the hub includes cylindrical member 18 on which the sheave 16 is mounted. While a sheave is shown as the driving element, the element may be a gear or sprocket, and means other than key ways 20 and 22 may be used to secure the element to the hub.

One of the important features of the present invention is the construction and design of rotor 62, and while the rotor is shown in two sections it may be formed as an integral unit with the center portion and flange or rim 88 consisting of one piece. The sections have laterally extending annular flanges 90 and 92 which form rim 88 and are preferably the same size and shape and, as shown in the drawings, are provided with a plurality of equally spaced holes 94 and ribs 96. The holes assist in distributing the dry fluid in the periphery of the chamber and the ribs increase the torque transmitted between the rotor and housing, as will be more fully explained hereinafter. In the embodiment shown, members 67 and 68 form a radially extending center portion on which the two flanges are mounted. The flanges, which may be formed integrally with one another, are essentially a single axially extending flange and they may be formed integrally with a single radially extending inner member. The single or dual flange construction preferably extends laterally from the center portion at right angles thereto. Other variations in the construction and configuration may be made within the scope of the present invention.

The rotor 62 is disposed in cavity 100 in housing 32 which contains the dry fluid which may be heat treated steel shot, indicated generally by numeral 102 shown lodged in the periphery of the cavity around the peripheral flanges 90 and 92 of the rotor, the position assumed when the drive is in operation. Under inoperative conditions, the shot falls to the bottom of the cavity and remains there until the housing is rotated, at which time the centrifugal force causes the shot to distribute itself uniformly around the periphery of the cavity as shown in the drawings. Dry fluids other than steel shot may be used; however, the heat treated steel shot has been found satisfactory and will give optimum performance in the drive over extended periods of time. As explained hereinbefore, holes 94 through the peripheral flanges assist in distributing he shot as the rotor and rotor housing rotate relative to one another and permit the shot to readily migrate to the restricted peripheral area 104 of the cavity, so that the area will be filled. The shot also normally extends around the edges of the flange and on the inner side thereof. The ribs 96 assist in obtaining effective torque between the end of the housing and the rotor under all operating conditions of the drive.

The inwardly sloping side walls 110 and 112 on sections 32 and 34 form the sides of restricted area 104 and cause the dry fluid to migrate readily to the area where maximum resistance is created between the rotor and housing. The two sections are clamped rigidly together by a plurality of screws 36 extending through the peripheral flange of section 32 and being threaded into the peripheral flange of section 34. Openings 116 and 118 which are closed by plugs 120 and 122, respectively, provide access to the cavity for adding dry fluid to the cavity and removing it therefrom. The housing rotates with shaft 12 and the rotor 62 and hub 70 rotate with sheave 16 on bearings 80 and 82, the cavity being sealed between the hub and housing by seals 124 and 126 so that the cavity is fully closed when the drive has been assembled and with the dry fluid in cavity 100.

The two sections of the rotor are preferably constructed of steel sheet or plate material, heat treated or coated to provide a hard, long wearing surface unaffected appreciably by abrasive action resulting from frictional engagement with the steel shot. Since the housing rotates relative to the rotor assembly, the internal surface of the housing defining cavity 100 may also have a specific surface configuration such as ribs or grooves in the side walls 110 and 112 and end wall 130, which cooperate with the ribs 96 or other types of projections on peripheral flanges 90 and 92, to increase the torque output of the drive. However, slippage between the rotor and the housing is essential for proper operation of the drive, in that the slippage permits a soft start requiring less torque than at normal operating speed. As the rotation accelerates, there is a substantial reduction of slippage until a solid connection is obtained between the rotor sections and the housing when the shot is lodged in mass in restricted area 104 at the periphery of cavity 100.

The ball bearing is held in position on sleeve 38 of the housing by annular shoulder 140 and a snap ring 142, and the rotor assembly is held from axial movement relative to the housing by a snap ring 144 disposed in a groove in the outer face of bearing 80 and between the inner end of annular member 18 and retainer 146. In order to facilitate heat transfer from the rotor to the housing and thence to fins 148 on the surface of the housing, the spacing between the rotor and the housing is preferably rather small, normally with the lateral edges of peripheral flanges 90 and 92 being relatively close to the internal surface of sections 32 and 34 and the peripheral end surface 130.

The wedge shape cross sectional configuration of the cavity utilizes to the fullest advantage the mechanical wedging effect which results from lodging the shot between the housing and the rotor in the area around the peripheral flanges 90 and 92 and end wall 130 and restricted area 104. This gives a larger component of force than in the conventional design of drives of this type, permitting a smaller unit to be used for a given torque output. Further, the design permits the rotor to be effectively used either as the driving or the driven element without any substantial difference resulting in the torque transmitted between the driving and driven shafts or other elements, thus providing maximum versatility for the unit in various applications and installations.

In the operation of the dry fluid drive described herein, with the drive mounted on shaft 12 of motor 14 and drive belts connected to sheave 16, rotation of shaft 12 rotates housing 30. As the housing accelerates in rotation the dry fluid 102 in cavity 100 which has settled to the bottom is propelled by centrifugal force into restricted area 104 at the periphery of the cavity between flanges 90 and 92 and peripheral end surface 130. The amount of dry fluid in the cavity normally is sufficient to completely surround flanges 90 and 92 and extend inwardly therefrom. The holes 94 in the peripheral flanges permit the dry fluid to pass through the flanges and distribute itself readily in area 104. In view of the restricted nature of the cavity resulting from the tapered side walls and the laterally extending flanges 90 and 92, the torque transmitted to the housing is efficiently transmitted to the rotor 62 and thence to hub 70 and to sheave 16. If there is any appreciable load on the equipment to be driven by the drive, substantial slippage may initially occur between the housing and rotor, and as the housing continues to rotate, the dry fluid is lodged firmly at the periphery of the cavity in area 104 and around flanges 90 and 92, thus effectively forming a solid connection between the housing and the rotor assembly so that the drive is substantially one hundred percent efficient in transmitting torque from shaft 12 to sheave 16. The heat generated during the starting operation and when the drive is under load, is readily transmitted from the rotor to the housing and dissipated through the external wall of the housing and the fins thereon. The present drive permits the use of a smaller, more compact unit to obtain the same torque for any given torque requirement, with a smooth start and without overheating while under heavy loads.

While only one embodiment of the present dry fluid drive has been described in detail herein, various changes and modifications may be made without departing from the scope of the invention.

I claim:

1. A dry fluid drive comprising a housing having a center axis about which said housing rotates, said housing having two spaced side walls and an annular peripheral portion therebetween defining a cavity in said housing concentric therewith, dry fluid in said cavity, and a rotor assembly disposed in said cavity and having a hub in alignment with the center axis of said housing and extending axially from the housing, said rotor having a radially extending portion and a lateally extending flange at the periphery of said radially extending portion spaced from said peripheral portion of said housing, circumferentially arranged irregularities on said flange for engagement with the dry fluid, said side walls, peripheral portion of said housing and said rotor flange forming a restricted area at the periphery of said rotor for containing a continuous mass of dry fluid when the drive is in operation.

2. A dry fluid drive as defined in claim 1 in which a series of spaced openings are disposed in said flange for distributing the dry fluid in said restricted area.

3. A dry fluid drive as defined in claim 1 in which said irregularities on said flange consist of a plurality of circumferentially spaced projections on the periphery thereof.

4. A dry fluid drive as defined in claim 1 in which a plurality of holes are provided in said flange for distributing said dry fluid and said irregularities on said flange consist of a plurality of axially disposed ribs on the periphery of said flange.

5. A dry fluid drive as defined in claim 4 in which said flange extends in both lateral directions from said radially extending portion and extends throughout the major portion of the width of said restricted area.

6. A dry fluid drive as defined in claim 1 in which said flange extends in both lateral directions from said radially extending portion at right angles thereto.

7. For use in a dry fluid drive having a housing with a cavity therein from dry fluid: a rotor assembly including a radially extending portion and a laterally extending flange disposed near the periphery of said radially extending portion at substantially right angles thereto, circumferentially spaced protrusions on the periphery of said flange for engaging the dry fluid, and means defining openings in said flange through which the dry fluid passes when the drive is in operation, for facilitating distribution of dry fluid in the cavity of the housing along the periphery of said flange.

8. A rotor for a dry fluid drive as defined in claim 7 in which said flange extends laterally in both directions from said radially extending portion at right angles thereto.

9. A rotor for a dry fluid drive as defined in claim 8 in which said openings consist of holes spaced around said flange on both sides of said radially extending portion and said protrusions on said flange consist of spaced ribs.

10. A rotor for a dry fluid drive as defined in claim 7 in which said openings consist of holes spaced around said flange, and said protrusions on said flange consist of axially disposed ribs.

11. A rotor for dry fluid drive as defined in claim 7 in which said rotor assembly has a hard abrasive resistant surface.

* * * * *